(12) United States Patent
De Rijk

(10) Patent No.: US 7,191,908 B2
(45) Date of Patent: Mar. 20, 2007

(54) RACK WITH UPRIGHTS AND GIRDERS WITH COUPLERS FACING THE UPRIGHTS, AND SYSTEM AND METHOD FOR PRODUCING SAME

(76) Inventor: Hugo Johan Casper De Rijk, 24 Biuzerdlaan, The Hague (NL) NL-2566

( * ) Notice: Subject to any disclaimer, the term of this patent is extended or adjusted under 35 U.S.C. 154(b) by 232 days.

(21) Appl. No.: 10/485,355

(22) PCT Filed: Jul. 25, 2002

(86) PCT No.: PCT/NL02/00503

§ 371 (c)(1),
(2), (4) Date: Jan. 30, 2004

(87) PCT Pub. No.: WO03/011075
PCT Pub. Date: Feb. 13, 2003

(65) Prior Publication Data
US 2004/0200794 A1    Oct. 14, 2004

(30) Foreign Application Priority Data
Jul. 30, 2001    (NL)    ................................. 1018663

(51) Int. Cl.
*A47B 43/00* (2006.01)
*A47B 47/00* (2006.01)
(52) U.S. Cl. .................. 211/191; 211/192; 211/208; 211/187
(58) Field of Classification Search .............. 211/181, 211/192, 208, 207, 187, 204, 206, 191; 312/265.1–265; 108/187, 107, 106, 153.1, 144.11, 180, 186; 52/36.1, 239, 645; 403/381, 169, 170
See application file for complete search history.

(56) References Cited

U.S. PATENT DOCUMENTS

| | | | | |
|---|---|---|---|---|
| 3,081,717 A | * | 3/1963 | Yurevich | 108/107 |
| 3,273,720 A | * | 9/1966 | Seiz | 211/192 |
| 3,352,584 A | * | 11/1967 | Engel | 403/316 |
| 3,647,079 A | * | 3/1972 | Ohlin | 211/192 |

(Continued)

FOREIGN PATENT DOCUMENTS

DE    3513553    10/1986

(Continued)

*Primary Examiner*—Jennifer E. Novosad
(74) *Attorney, Agent, or Firm*—Browdy and Neimark, PLLC

(57) ABSTRACT

A rack comprises two upright elements and a girder element, wherein the girder element extends between the two upright elements and comprises couplers, wherein the upright element or the coupler is provided with at least one coupling cam, whilst the other is provided with a cam-receiving groove belonging to the coupling cam, which cam-receiving groove has at least one open end and is delimited, at least partially, by a cam-supporting wall, and wherein the upright element or the coupler is additionally provided with at least one substantially vertically extending coupling rib, whilst the other is provided with a rib-receiving groove belonging to the coupling rib. At least one free end of the cross section of the coupling cam extends substantially in the direction of the longitudinal axis of the girder element, and the free end of the cross section of the coupling rib extends substantially in the direction perpendicular to the longitudinal axis of the girder element.

18 Claims, 7 Drawing Sheets

U.S. PATENT DOCUMENTS

| | | | |
|---|---|---|---|
| 4,074,812 A | * 2/1978 | Skubic et al. | 211/192 |
| 4,203,373 A | 5/1980 | Conti | |
| 4,285,436 A | * 8/1981 | Konstant et al. | 211/192 |
| 4,648,517 A | * 3/1987 | Schafer | 211/183 |
| 4,700,916 A | * 10/1987 | Bastian et al. | 248/224.8 |
| 4,708,252 A | * 11/1987 | Azzi | 211/192 |
| 4,778,067 A | * 10/1988 | Bellerose | 211/187 |
| 4,934,858 A | * 6/1990 | Beaulieu | 403/174 |
| 5,174,200 A | 12/1992 | Jeandel et al. | |
| 5,377,851 A | * 1/1995 | Asano et al. | 211/191 |
| 6,273,281 B1 | * 8/2001 | Berglund | 211/187 |

FOREIGN PATENT DOCUMENTS

| | | |
|---|---|---|
| EP | 0686817 | 12/1995 |
| FR | 1368234 | 7/1964 |
| FR | 2796535 | 1/2001 |

* cited by examiner

RACK WITH UPRIGHTS AND GIRDERS WITH COUPLERS FACING THE UPRIGHTS, AND SYSTEM AND METHOD FOR PRODUCING SAME

BACKGROUND

The invention relates to a rack according to the preamble of claim 1.

A rack of this type is known from European patent specification EP 0 686 817. This patent specification discloses in FIG. 1A an embodiment of a rack which is made up of at least two uprights and shelves which are placed between the uprights and rest thereupon. The uprights each comprise, in this case, two upright elements which are connected close to the top and bottom ends. The shelves comprise two girder elements which extend between two upright elements forming part of separate uprights.

The rack is constructed by fastening two couplers by means of clamp connections to two mutually opposing upright elements. Following placement of these couplers, the girder element can be placed between them, which girder element is clamped to the couplers by means of a wedge-shaped connection. A stable rack is thus obtained without the use of secondary connecting elements such as bolts and the like.

The good quality of the clamping connection between the upright elements and the couplers is attributable to the combined effect of a coupling cam and a coupling rib on the upright element, which cooperate with respectively a cam-receiving groove and a rib-receiving groove located on two separate sides of the coupler. One or more walls of the cam-receiving groove in the coupled state act as a cam-supporting wall. Following coupling to the upright element, the coupler rests by means of the cam-supporting wall on the coupling cam of the upright element. At the same time, the coupling cam and the cam-receiving groove ensure that the coupler clamps against the upright element, by virtue of the fact that one internal wall of the cam-receiving groove and one wall of the coupling cam stand obliquely relative to the vertical. The coupling rib, in combination with the rib-receiving groove, limits the freedom of motion in the horizontal direction.

A disadvantage with the clamping connection of this known rack is that a coupler has to be fitted to the coupling rib and coupling cam by means of a rotary motion about a vertical axis at the site of the coupling rib. It will be clear that this rotary motion can only be performed on one upright element at a time and that at least one coupler must therefore be loose from the girder element in order to effect a connection. In practice, in many cases even both couplers will be released, because it is impossible or impractical to co-rotate the girder element with the coupler during coupling. A relatively large number of loose components, as well as a relatively large number of operations, are therefore necessary to assemble a rack.

A second disadvantage of this known rack is that the upright element can be made only by pressing or die-casting in dies of a certain length.

SUMMARY OF THE INVENTION

The object of the present invention is to provide a rack in which these disadvantages are at least partially overcome, or to provide a usable alternative. More particularly, the object of the invention is to provide a rack which is simple to assemble, is stable and is relatively cheap to produce.

According to the invention, this object is achieved by means of a rack according to claim 1. In this, the rack comprises at least two upright elements and a girder element, whilst a coupler is provided at each of the ends of the girder element. The girder element with couplers is coupled to the upright elements by means of at least one coupling cam and one coupling rib, with complementary receiving grooves. These are respectively referred to as the cam-receiving groove and the rib-receiving groove. The coupling cam, coupling rib and receiving grooves are located, at least on one combination of upright element and coupler, at one of the ends of the girder element. The coupler and the upright element on the other side of the girder element can be identically or differently shaped. The coupling cam is located on the upright, or on the coupler, the cam-receiving groove being located on the other of these two. The same applies mutatis mutandis to the coupling rib and rib-receiving groove, which extend substantially vertically. The coupling rib, or the rib-receiving groove, located on the upright element can extend along the whole of the length of the upright element, or along a part thereof.

The cam-receiving groove is realized such that the coupler can rest by means of the coupling cam upon the upright element and one or more walls of the cam-receiving groove. This part of the wall, or walls, of the cam-receiving groove is referred to as the cam-supporting wall. In addition, the cam-receiving groove comprises at least one opening, by which the coupling cam is received as the coupler is coupled to the upright.

The longitudinal margin of the coupling rib, which, viewed in cross section, is the free end of the rib, extends in a direction transversely to the longitudinal axis of the girder element, whilst the longitudinal margin of the coupling cam extends in a direction transversely hereto, that is to say in the direction of the longitudinal axis of the girder element. The advantage of these mutual directions is that the coupler can be coupled to the upright element by means of two translatory motions in the plane transversely to the longitudinal axis of the girder element. By virtue of the fact that neither motions in the longitudinal direction of the girder element nor rotations are necessary, the couplers can be fastened during coupling, or even permanently, to the girder element and both couplers of one girder element can simultaneously be coupled to their respective upright elements.

Following coupling, a stable connection is obtained. In the vertical direction, the girder element rests, by means of the couplers and the combination of coupling cam and cam-supporting wall of the receiving groove, on each of the upright elements. In the horizontal direction, the coupling cam and coupling rib, each by means of their respective receiving groove, limit both horizontal translation motions. The same combination also renders rotation about each horizontal axis impossible, whilst, in practice, rotation about a vertical axis is also impossible, since the girder element is coupled by both ends to an upright element.

The coupling cams, coupling ribs and their respective receiving grooves can be fitted in the horizontal direction to any chosen position along the wall of the upright element, or of the coupler.

Both the coupling cam and the coupling rib can be realized with varied cross sectional shapes. Examples thereof are a wedge shape, rectangular shape, semi-circular and oval shapes. The cross sectional shape of the coupling cam can be undercut.

Advantageously, the coupling cam can be fastened by a web, also referred to as a cam web, to the upright element, or the coupler. Viewed in cross section, the web extends in a direction other than that of the cam. This embodiment has at least two advantages. In the first place, the web can be fitted in any chosen direction to one of the side faces of the upright element, whilst the cam still maintains, however, the direction described in claim 1. Two cams, which are each intended for the coupling of a separate girder element to the same upright element, can thereby, for example, be fitted to the same longitudinal side face of the upright element. In the second place, the web, following coupling, removes an extra degree of freedom of motion, thereby precluding rotation of the coupler about a vertical axis, even if the other end of the girder element is kept free.

In particular, a plurality of coupling cams, or cam-receiving grooves, can be fitted at some distance apart in the longitudinal direction of an upright element. A plurality of girder elements can be thereby be coupled one above the other to the same upright element.

Advantageously, the coupler can also be provided with a plurality of cam-receiving grooves, or coupling cams. Each cam-receiving groove or coupling cam on the coupler engages on one coupling cam, or cam-receiving groove, on the upright element. In this embodiment, the cams can be realized with a relatively small height and can additionally be fitted at a relatively small distance apart. The positive result of this is that there are many more options in the choice of height for fastening a girder element to the upright element than in the embodiment according to the prior art.

In another embodiment, the upright element and the coupler are provided with at least one extra combination of coupling rib with corresponding receiving groove. This combination removes extra freedom of motion, in a comparable manner to the cam web as described above. By providing the upright element and the coupler, instead of with one extra combination of coupling rib with receiving groove, with a series of a plurality of ribs and receiving grooves, an extra stable connection is obtained, a load on the girder element being transmitted, via the plurality of ribs and grooves on the coupler and the upright element, to the upright element.

In a particular embodiment, the rack is wholly or partially constructed in plastic. This material offers advantages, from a hygienic viewpoint, for the storage of foods. The coupling elements, such as cams, ribs and receiving grooves, can be directly jointly moulded during production, thereby producing cost savings.

Advantageously, one or more walls of the coupling cam, and/or of the cam-receiving groove, can make an oblique angle relative to the vertical. This oblique angle offers two advantages. In the first place, the obliquely constructed wall forms a boundary in the vertical direction, whereby this acts as a cam-supporting wall. In the second place, one or more obliquely constructed walls can produce a clamping effect between the coupler and the upright element in one or two directions. Clamping in the direction of the longitudinal axis of the girder element is obtained by making the wall of the coupling cam, which stands perpendicular to the longitudinal axis of the girder element, oblique. As a result, the actual coupler will clamp during coupling against the upright element, the coupling rib will clamp against a side wall of the rib-receiving groove, and/or the cam-receiving groove will clamp against any web present on the coupling cam. A similar effect is achieved by making the corresponding internal wall of the cam-receiving groove oblique. Clamping in the horizontal direction at right angles to the longitudinal axis of the girder element is obtained by making one or two of the side walls of the coupling cam oblique and/or by making the corresponding walls of the receiving groove oblique. It is advantageous to use a combination of the above embodiments, since clamping is then obtained in two directions.

In a particular embodiment, both walls of the cam-receiving groove converge, whereby the clamping effect can occur in the direction at right-angles to the longitudinal axis of the girder element without the contribution of the coupling rib, or any cam web present.

Advantageously, a wall of a coupling rib can make an oblique angle relative to a notional plane perpendicular to the longitudinal axis of the girder element. This can also apply to a plurality of walls of the rib, as well as to the walls of the rib-receiving groove. Owing to this oblique course, the coupling rib will be received in the rib-receiving groove in a clamping manner, thereby making the connection extra stable. This clamping effect can be supplementary to that of previously described measures, but can also be achieved in isolation.

In a particular embodiment, an upright element can be arranged such that all cams, coupling ribs, receiving grooves and any other elements which are fitted thereto have a constant cross section, viewed in the longitudinal direction of the upright element. In this context, it is easily conceivable for this constant course to be only present during the start of the production of the upright element and for the constant course still to be interrupted during subsequent working steps. A prerequisite for this constant course is that any cams, ribs and receiving grooves which have a wall running obliquely relative to the vertical shall be provided on the coupler. The advantage of a constant cross section is that this makes several production methods possible, which, moreover, are cheaper and more flexible.

Further embodiments of the invention are defined in the sub-claims.

The invention also relates to the use of the rack in cold stores and store rooms according to claim 13. This rack is especially attractive for use in the food industry, owing to the good hygienic characteristics resulting from the absence of loose connecting means and from the plastics exterior of some of the embodiments.

The invention additionally relates to an assembly of non-coupled upright and girder elements according to claim 14. This non-coupled state may arise, for example, during production, transport, storage, or sale.

Claims 15 to 17 define a method, including a number of variants, for the production of an upright element by extrusion. In the extrusion, the whole of the cross section of the upright element can be moulded directly in one operation, but the exterior of the upright element can also be extruded around a core profile, or, in a subsequent working step, an extruded outer edge can be fitted around a core profile. Any coupling ribs and receiving grooves can be coextruded in one and the same working step. In the same step, a continuous cam profile can also be coextruded, which is then locally interrupted in a subsequent working step, for example by means of a milling operation. Extrusion undoubtedly offers two advantages. Firstly, this provides a relatively cheap production method. Secondly, different lengths can easily be produced. The forming of cams in a separate production step, through the removal of material from the cam profile, offers an extra advantage. Only when the material is removed is it established what the vertical distance between—and height of—the cams becomes. This makes it possible to produce a stock of upright elements and to make them specific at a later stage.

BRIEF DESCRIPTION OF THE DRAWINGS

A number of embodiments of the invention will be explained in greater detail with reference to the appended drawings, in which.

DETAILED DESCRIPTION OF EMBODIMENTS

Figure 1:
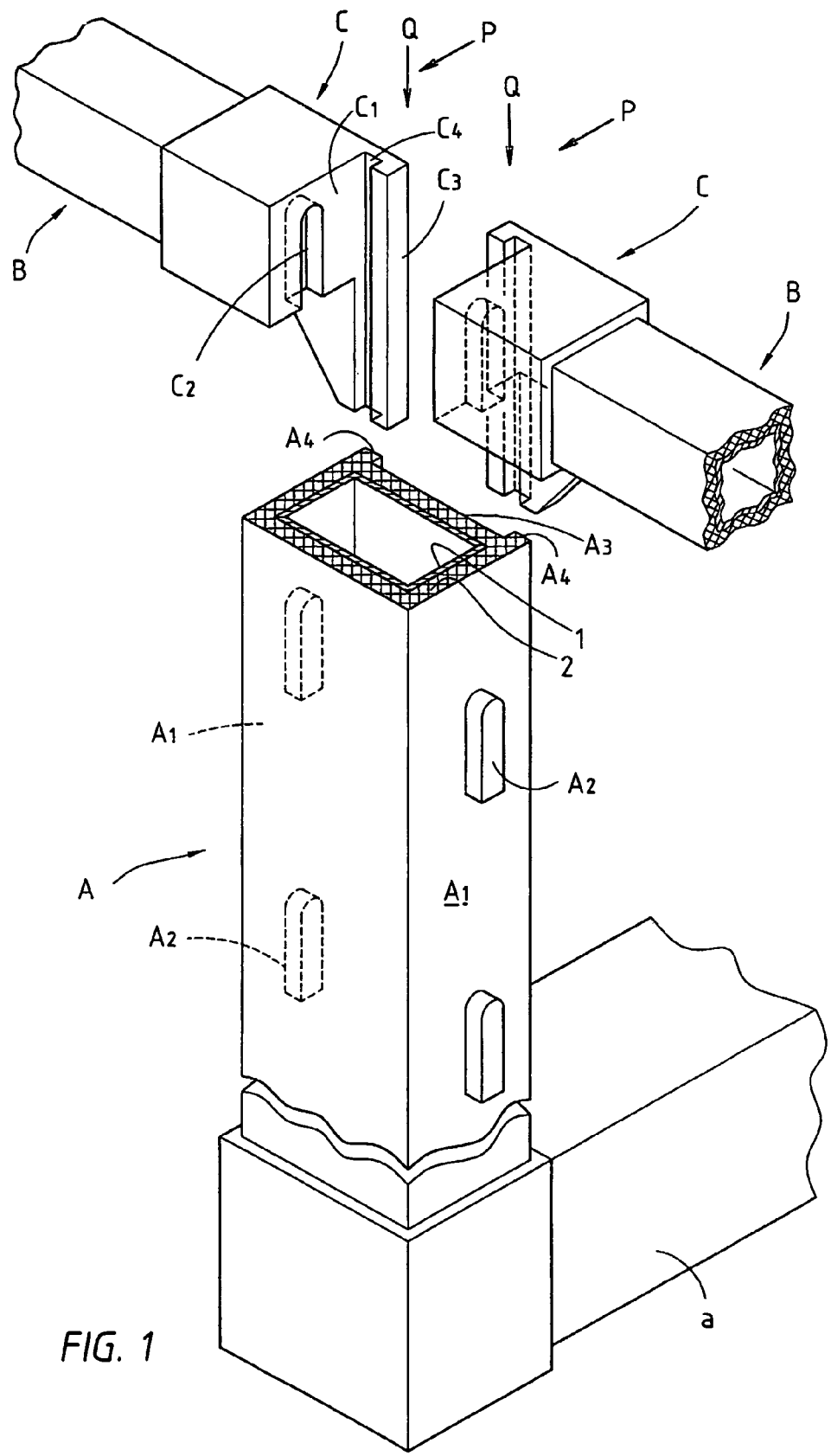
FIG. 1 is a perspective view of an upright element and a pair of girder elements to be connected thereto, the core profile of the upright element being a pipe profile.

The upright element A represented in FIG. 1 comprises a core profile 1 and a plastics casing 2.

In the embodiment according to FIG. 1, the core profile 1 is formed by a pipe profile of rectangular cross section, preferably consisting of metal, such as steel.

The upright element A is more particularly intended to form, together with a second similar upright element, an upright for a rack. To this end, the two upright elements are joined together at the top and bottom ends by a transverse connecting element, such as the lowermost transverse connecting element a partially represented in FIG. 1. For the sake of clarity, the uppermost part of the upright element and the uppermost transverse connecting element are omitted in FIG. 1.

The upright element A represented in FIG. 1 is intended to be connected at different heights to a pair of girder elements B extending in opposite directions from the upright element. In this case, each girder element can form, together with a girder element which is situated at a distance therefrom in the transverse direction and which is to be connected to the second upright element of the upright in question, a (support for a) shelf.

The girder elements B likewise comprise a (metal) core profile and a plastics casing. The girder elements are provided at the ends with a plastic-moulded coupler C, which, as a separate moulding or pressing, can be fitted to the end in question of the girder element and can be glued thereto.

The couplers C shown in FIG. 1 have an end face C1, which, in the intended connection, comes to bear against the longitudinal side face A1 of the upright element A, which longitudinal side face falls within the plane of the upright to be formed with a second upright element. In the end face C1, a cam-receiving groove C2, which is closed at the top end and is open at the bottom end, is recessed.

On each longitudinal side face A1 of the upright element A there is a series of coupling cams A2, which are spaced apart in the longitudinal (=vertical) direction of the upright element and fit tightly into the slots (cam-receiving grooves) C2. The cams A2 have, in the longitudinal direction of the upright element A, a constant (possibly undercut) cross section, the free end of which extends in the direction of the longitudinal axis of the girder element B. Owing to the constant cross section, the cams A2, in the production of the upright element A, can be coextruded, in the form of a continuous cam profile, with the casing 2 of the upright element. The coextruded cam profile can then subsequently be divided into separate cams by locally removing the material from the continuous cam profile and rounding off the remaining cams at the top end in accordance with the shape of the closed ends of the slots C2. Each "remaining" coupling cam A2 could be further sub-divided into, for example, two, or more, separate cam parts.

Each coupler C also has a part C3 protruding beyond the end face C1, in which part a slot or receiving groove C4 is recessed, which extends perpendicular to the longitudinal direction of the girder element B and is intended to receive a coupling rib A4 protruding from the longitudinal side face A3, adjoining the longitudinal side face A1, of the upright element A. Both coupling ribs A4 protrude from the same adjoining longitudinal side face A3 of the upright element A in a direction transversely to the longitudinal axis of the girder element B and extend over the entire length of the upright element as a continuous profile, which is coextruded as such in the production of the upright element.

The situation represented in FIG. 1 is obtained by moving the girder elements B and the couplers C along an arrow P until the receiving grooves C4 of the coupler C are aligned with the continuous coupling ribs A4 of the upright element A. Since the upright element, unlike the situation drawn in FIG. 1, extends, broadly speaking, further upwards, the coupling ribs A4 of the upright element A are now located in the rib-receiving grooves C4 of the couplers C and the cam-receiving grooves C2 of the couplers C are located between two successive coupling cams A2. It will be clear that the girder elements B can then easily be connected to the upright element A by displacing the girder elements B and the couplers C according to the arrows Q. The coupling cams A2 thus engage in the corresponding cam-receiving grooves C2 in the end faces C1 of the couplers C until the top ends of the coupling cams A2 hit against the uppermost closed ends of the receiving grooves C2. The result is a strong, stable connection without secondary connecting elements, such as screws. In this context, it should also be noted that the height of the part C3 of the coupler C, protruding in front of the end face C1, is enlarged towards the bottom relative to the rest of the coupler C. The walls of the receiving groove C2 can in this case converge a little relative to each other in order to promote a certain wedging effect and hence the clamping effect.

Figure 2:
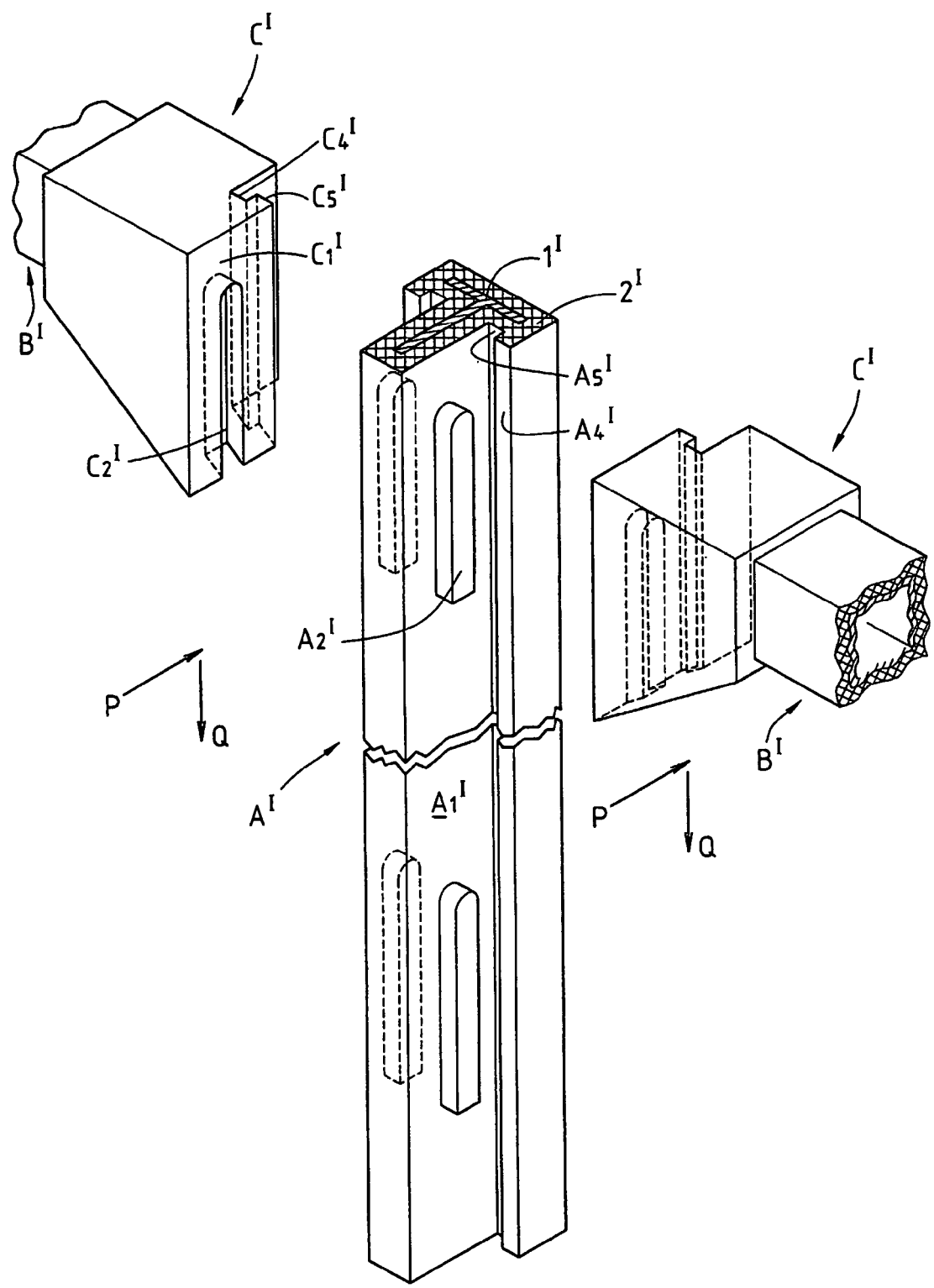
FIG. 2 is a view similar to FIG. 1, the core profile of the upright element being a T-profile.

In the embodiment according to FIG. 2, a T-profile $1^I$ is used as the core profile for the upright element $A^I$. The upright element $A^I$ consequently also has the shape of a T-profile. By comparison with the embodiment according to FIG. 1, in FIG. 2 the relevant longitudinal side faces, couplers, coupling cams and receiving grooves are denoted by the same reference numerals as in FIG. 1, but provided with an $^I$.

Just as in the embodiment according to FIG. 1, a girder element $B^I$ can be connected to the upright element $A^I$ by means of a simple manoeuvre, namely by bringing the particular coupler $C^I$, via the interspace between two successive coupling cams $A2^I$ (see arrow P), into engagement with the continuous coupling rib $A4^I$ of the upright element and then, through a vertical displacement according to the arrow Q, effecting the engagement between the receiving groove $C2^I$ and the particular coupling cam $A2^I$. It should further be noted in this context that the rib-receiving groove $C4^I$ on the side of the end face $C1^I$ is flanked by a rib part $C5^I$, which fits into the continuous receiving groove $A5^I$ which is present on that side of the continuous coupling rib A4$^I$ facing the web of the T-profile 1$^I$. The rib part C5$^I$ is staggered inwards over such a distance relative to the outer side of the rest of the coupler C$^I$ that in the mounted state the coupler C$^I$ has come to lie in a single plane with the outer side of the transverse part of the T-shaped upright element A$^I$.

Figure 3:
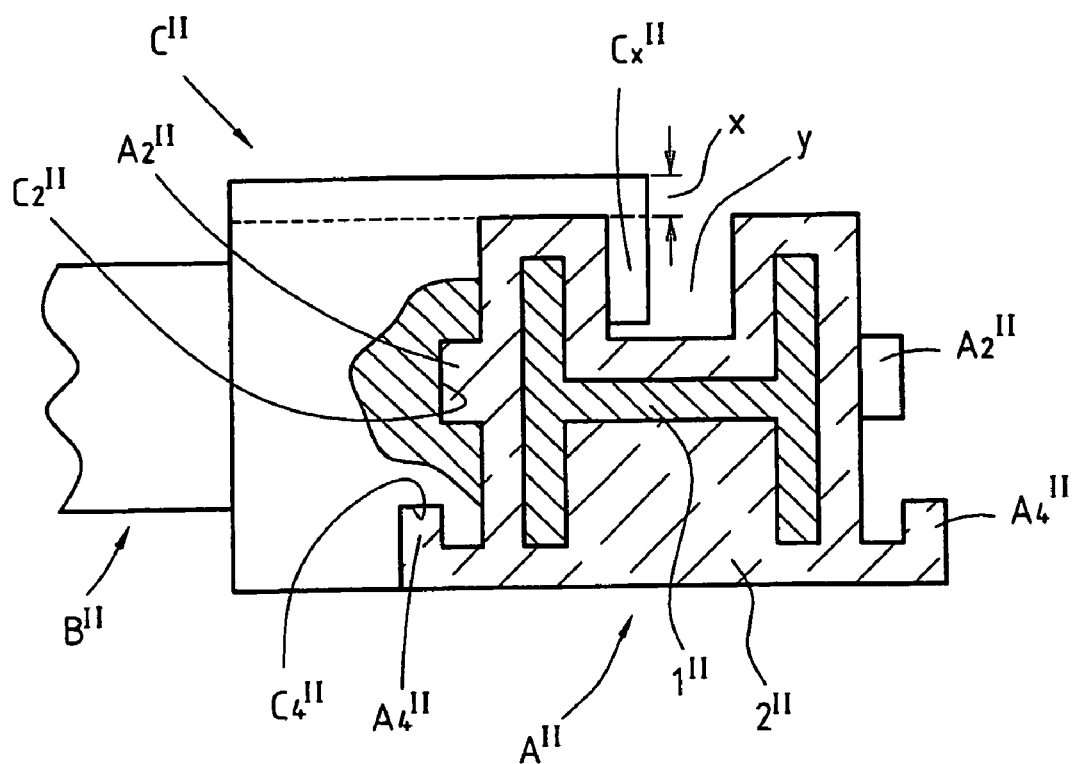
FIG. 3 shows a cross section through a clamping connection according to the invention in a third embodiment, the core profile of the upright element being a H-profile.

In the embodiment according to FIG. 3, the upright element A$^{II}$ has an H-shaped core profile 1$^{II}$ and this upright element is connected to a girder element B$^{II}$.

The girder element B$^{II}$ has a coupler C$^{II}$ which, similarly to the coupler C$^I$ in FIG. 2, is provided with a cam-receiving groove C2$^{II}$, which is closed at the top end, and a rib-receiving groove C4$^{II}$, which is open both at the top end and the bottom end. These receiving grooves cooperate with, respectively, a coupling cam A2$^{II}$ and a continuous coupling rib A4$^{II}$, which form part of the plastics cladding 2$^{II}$ of the upright element A$^{II}$.

Unlike the embodiment according to FIG. 2, the coupler C$^{II}$ is widened over a distance x and on the coupler C$^{II}$ an extra coupling rib CX$^{II}$ is formed, which engages, respectively, in the interspace and in the rib-receiving groove y of the upright profile A$^{II}$. A similar extra rib/groove connection can be realized in an upright element of the type according to other figures.

Figure 4:
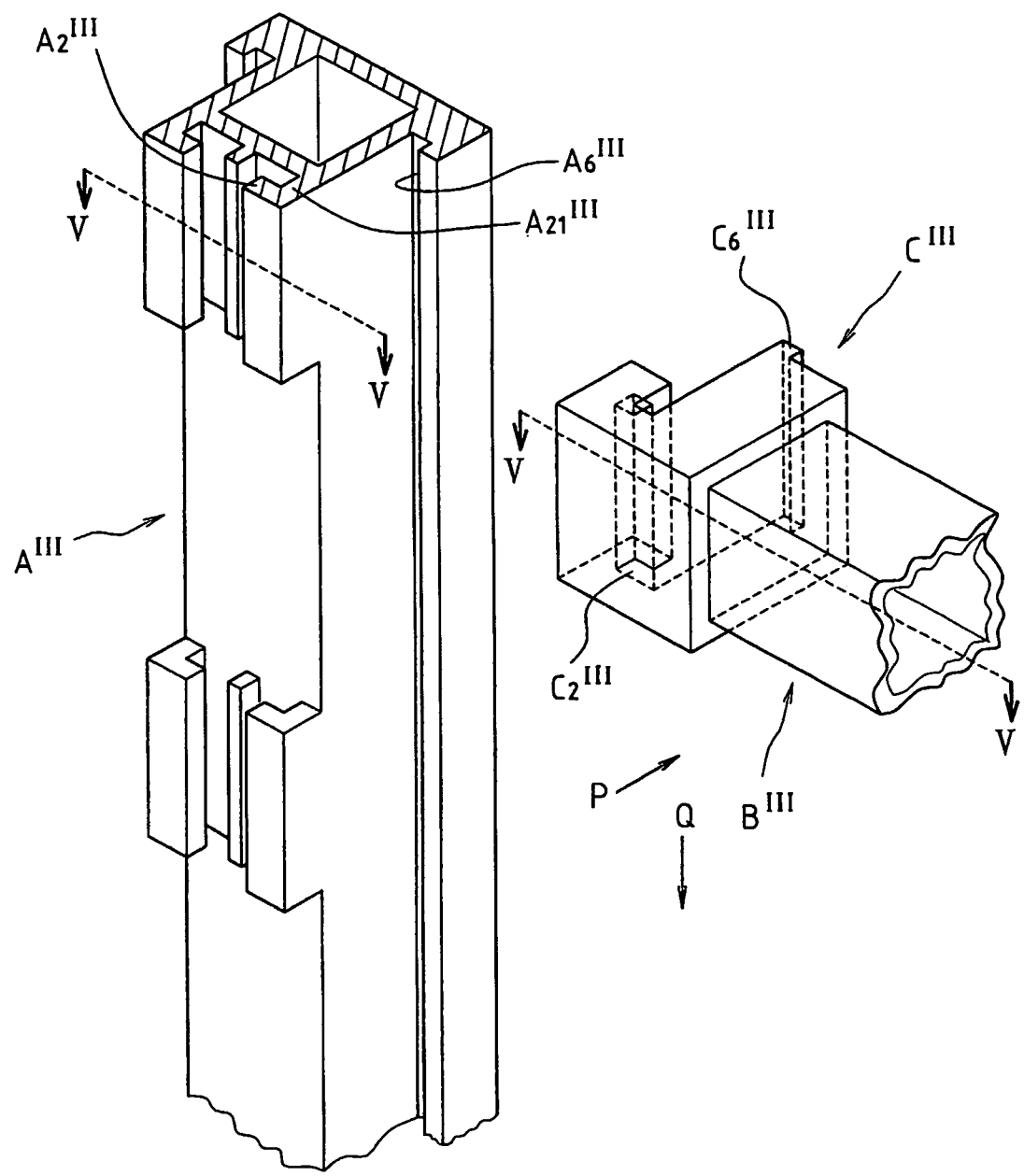
FIG. 4 is a perspective view of an embodiment having an opposite direction of the coupling cam relative to the preceding figures and different positioning of the coupling rib.

In the embodiment according to FIG. 4, the upright element A$^{III}$ can be connected to a girder element B$^{III}$.

The girder element B$^{III}$ has a coupler C$^{III}$, which is provided with a cam-receiving groove C2$^{III}$, which is closed at the top end, and a coupling rib C6$^{III}$. The cam-receiving groove C2$^{III}$ cooperates with a coupling cam A2$^{III}$ on the upright element A$^{III}$.

Unlike the embodiment according to the preceding figures, the free end of the coupling cam A2$^{III}$ points away from the coupler C$^{III}$ and it is connected by a web A21$^{III}$ to the upright element A$^{III}$. Furthermore, also unlike previous figures, the upright element A$^{III}$ is provided with a rib-receiving groove A6$^{III}$, which cooperates with the coupling rib C6$^{III}$. In this embodiment, too, coupling is effected by placing the coupler C$^{III}$ according to the arrow P between two coupling cams A2$^{III}$ and moving it downwards along the arrow Q.

Figure 5:
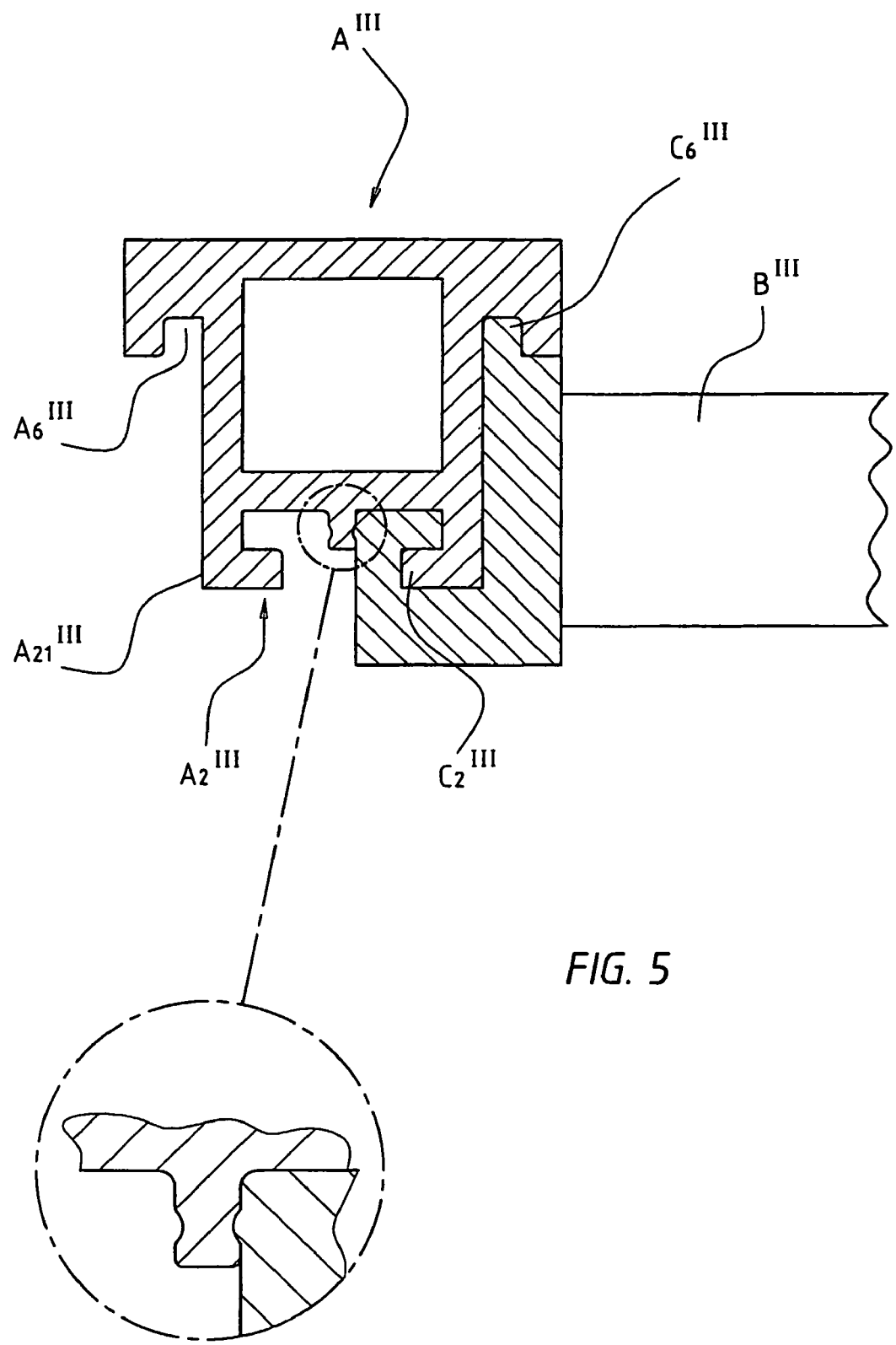
FIG. 5 is a cross section through FIG. 4, after the realization of a coupling.

A cross section along V—V—V—V in FIG. 4, in the coupled state, is shown in FIG. 5.

Figure 6:
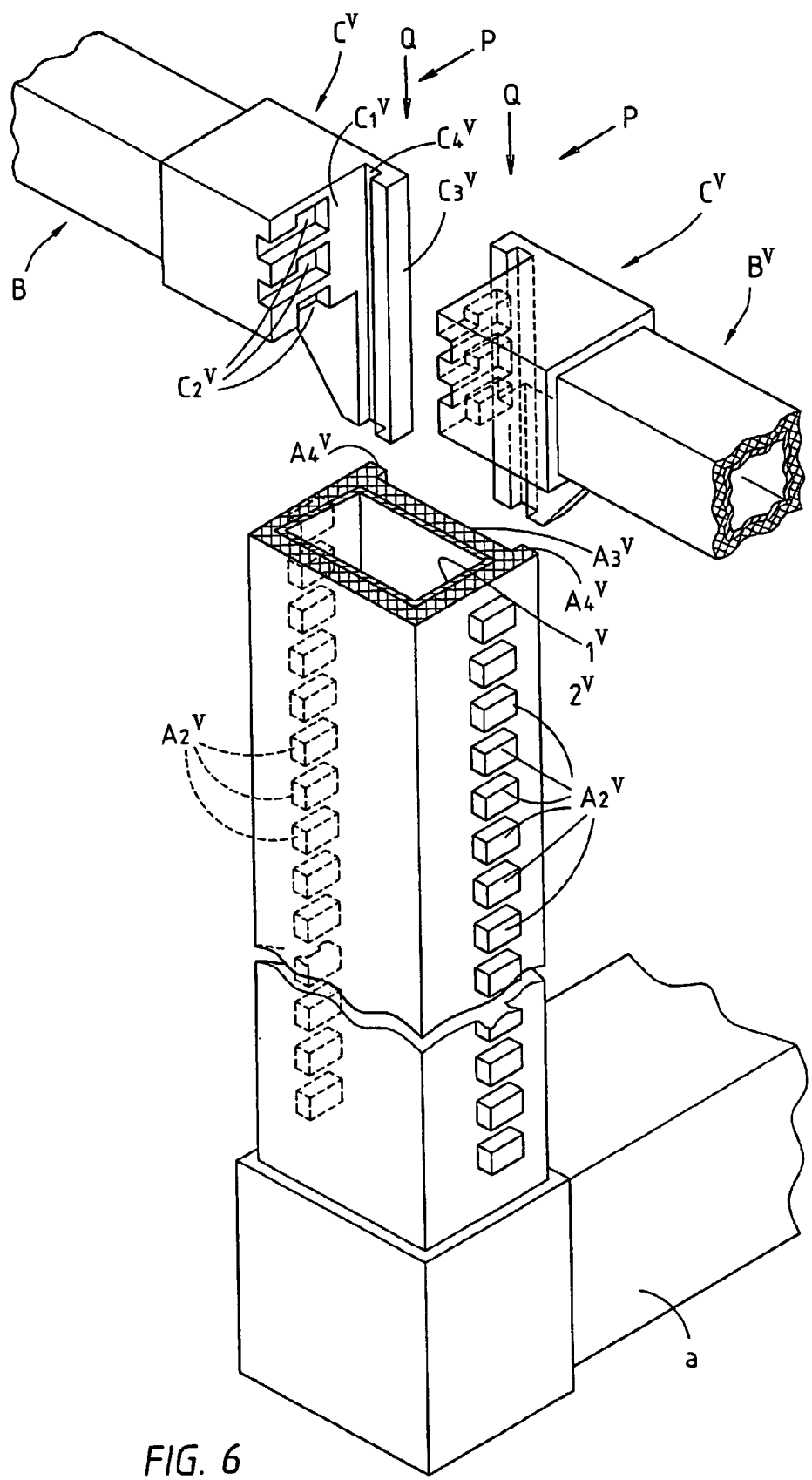
FIG. 6 is a perspective view of an embodiment having a plurality of coupling cams.
Figure 7:
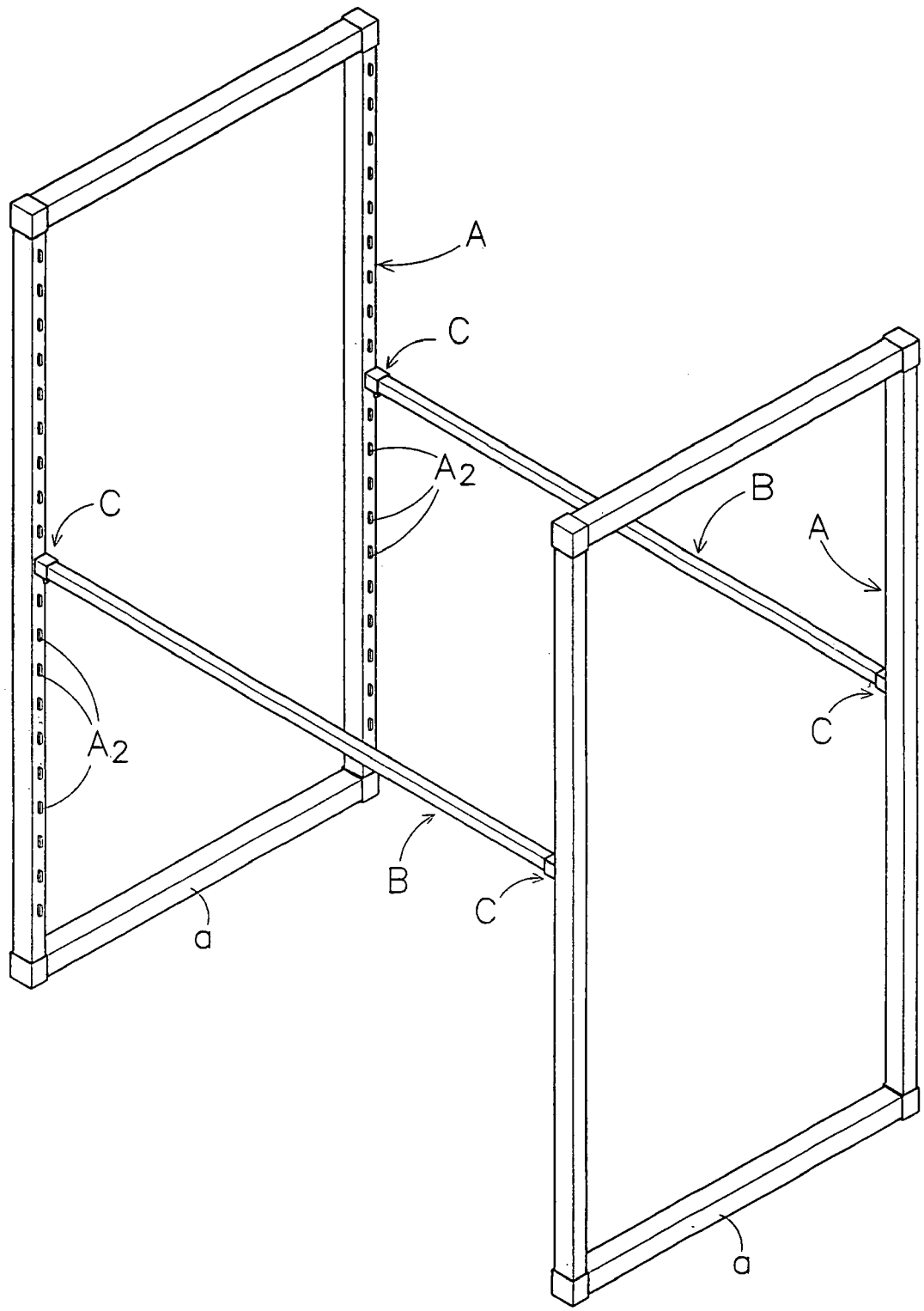
FIG. 7 is a perspective view of the rack

The embodiment of FIG. 6 shows a variant on FIG. 1. In this variant, the coupler C$^V$ is provided with in each case three cam-receiving grooves C2$^V$, which cooperate with three of the coupling cams A2$^V$ on the upright element A$^V$. Unlike other figures, two of the cam-receiving grooves C2$^V$ are open towards the side in order to receive the cams A2$^V$ during the horizontal motion P which precedes the vertical motion Q.

In addition to the illustrated embodiments, many variants are possible, including combinations of measures from different embodiments. Thus, the cross section of the upright element can assume various shapes, including round, oval, polygonal and I-shaped.

At least one coupling cam can also be fitted to the coupler instead of to the upright element, in which case the corresponding cam-receiving groove is provided on the upright element instead of on the coupler. The same applies mutatis mutandis to the coupling rib and the corresponding rib-receiving groove in relation to the upright element and the coupler. Two coupling cams, each intended for a separate coupler, could also be connected by a common web to the upright element.

It is further possible to interrupt not only the coupling cams, but also the coupling ribs in the longitudinal direction, so that the rib-receiving groove can also be closed at one, or two, ends.

One face of an upright, for example the longitudinal side face A3, or A3$^V$, can also be provided with a plurality of ribs, which cooperate with rib-receiving grooves on the coupler.

In the embodiments which have more than one cam-receiving groove per upright element or coupler, these cam-receiving grooves can be realized such that they are completely separated from one another or they can be integrated to form a ramified cam-receiving groove having a plurality of open ends, which, during coupling, can each receive a coupling cam.

According to the invention, a rack is thus provided which is cheap to produce, can be easily put together by anyone without further tools or seperate connecting means, is stable and is suitable for use in the storage of foods.

The invention claimed is:

1. Rack, comprising at least two upright elements and at least one girder element, wherein said girder element extends between said two upright elements and comprises couplers at its ends facing said upright elements,
   wherein at least one of said upright elements is provided with at least one coupling cam, whilst said coupler is provided with a cam-receiving groove belonging to said coupling cam, which cam-receiving groove has at least one open end and is delimited, at least partially, by a cam-supporting wall, and
   wherein the at least one upright element or said complementary coupler is additionally provided with at least one substantially vertically extending coupling rib, whilst the other of said at least one upright element and said coupler is provided with a rib-receiving groove belonging to the coupling rib, wherein at least one free end of substantially in the direction of the longitudinal axis of said girder element, and
   a free end of the cross section of said coupling rib extends substantially in the direction perpendicular to the longitudinal axis of the girder element.

2. Rack according to claim 1, wherein said coupling cam is connected by a web to said upright element, which web, viewed in cross section, extends in a direction other than that of said coupling cam.

3. Rack according to claim 1, wherein said upright element is provided with a series of coupling cams which are spaced apart in the longitudinal direction of said upright element.

4. Rack according to claim 3, wherein said coupler is provided with a plurality of cam-receiving grooves.

5. Rack according to claim 1, wherein said upright element or said coupler is provided with a second substantially vertically extending coupling rib, whilst the other of said upright element and said coupler is provided with a second rib-receiving groove belonging to said second coupling rib.

6. Rack according to claim 1, wherein said upright element, at least on an outer side, is moulded from plastic, from which said coupling cam, said coupling rib are jointly moulded.

7. Rack according to claim 6, wherein said upright element, comprises, a substantially rectangular pipe profile.

8. Rack according to claim 1, wherein at least a part of said cam-supporting wall is formed by a closed end of said cam-receiving groove.

9. Rack according to claim 1, wherein at least a part of said cam-supporting wall is formed by a wall of said cam-receiving groove, which makes an angle relative to the vertical.

10. Rack according to claim 9, wherein two side walls of said coupling cam mutually converge.

11. Rack according to claim 9, wherein the two sided walls of said cam-receiving groove mutually converge.

12. Rack according to claim 1, wherein at least one of said upright elements has a cross section which is constant during the production.

13. Use of a rack according to claim 1 in cold stores and store rooms.

14. System comprising at least two upright elements and at least one girder element, wherein the girder element on at least one of its ends comprises a coupler, intended for a rack according to claim 1.

15. Method for producing an upright element for a rack according to claim 1, comprising a step of the extrusion of at least an outer wall of said upright element, the coextrusion, as a continuous profile, of said coupling ribs, coupling cams and receiving grooves, and a step of the local removal of profile material from between said coupling cams to be moulded.

16. Method according to claim 15, wherein the material to be extruded is extruded around a core profile.

17. Method according to claim 15, wherein said extruded outer wall of said upright element, following the extrusion, is fitted over a core profile.

18. Rack according to claim 1, wherein said coupler, at least on the outer side, is moulded from plastic, from which said coupling cam, and said receiving grooves are jointly moulded.

* * * * *